United States Patent [19]

Goodvin

[11] 4,084,708
[45] Apr. 18, 1978

[54] BALE LIFTER AND CARRIER ATTACHMENT

[76] Inventor: Harold R. Goodvin, Rte. #3, Maryville, Mo. 64468

[21] Appl. No.: 729,600

[22] Filed: Oct. 4, 1976

[51] Int. Cl.² .......................................... B65G 67/02
[52] U.S. Cl. ........................... 214/1 HA; 214/DIG. 4; 242/86.5 R
[58] Field of Search ............. 214/766, 130 C, DIG. 4, 214/145 R, 350, 86 A, 78, 1 HH, 1 HA, 501; 254/139.1; 296/35 A, 23 MC; 242/86.5 R

[56] References Cited
U.S. PATENT DOCUMENTS

| 3,632,054 | 1/1972 | Heppelmann et al. | 242/86.5 R |
| 3,880,305 | 4/1975 | Van Polen | 214/1 HA |
| 3,897,880 | 8/1975 | Waske et al. | 214/1 HH |
| 4,008,862 | 2/1977 | Wilmes | 242/86.5 R |
| 4,015,739 | 4/1977 | Cox | 214/130 C |

OTHER PUBLICATIONS

Gold'n Spike Bale Carriers, Gold'n Spike Industries, Nov. 12, 1976.

Primary Examiner—L. J. Paperner
Assistant Examiner—Ross Weaver
Attorney, Agent, or Firm—John A. Hamilton

[57] ABSTRACT

A bale lifter and carrier attachment for pick-up trucks, tractors and other self-propelled vehicles consisting of a frame adapted to be mounted on a vehicle for pivotal movement on a horizontal axis transverse to the direction of travel of the vehicle, a pair of prongs affixed to the frame and extending therefrom in vertical planes parallel to the direction of travel, and a power device for pivoting the frame to move the prongs from a horizontal position, in which position the prongs may be inserted into a bale by propelling the vehicle, and an inclined position tilted upwardly toward their free ends, whereby the bale is lifted from the ground and secured against dislodgment from the prongs. The prongs may also serve as mountings for a bale-unrolling device.

3 Claims, 7 Drawing Figures

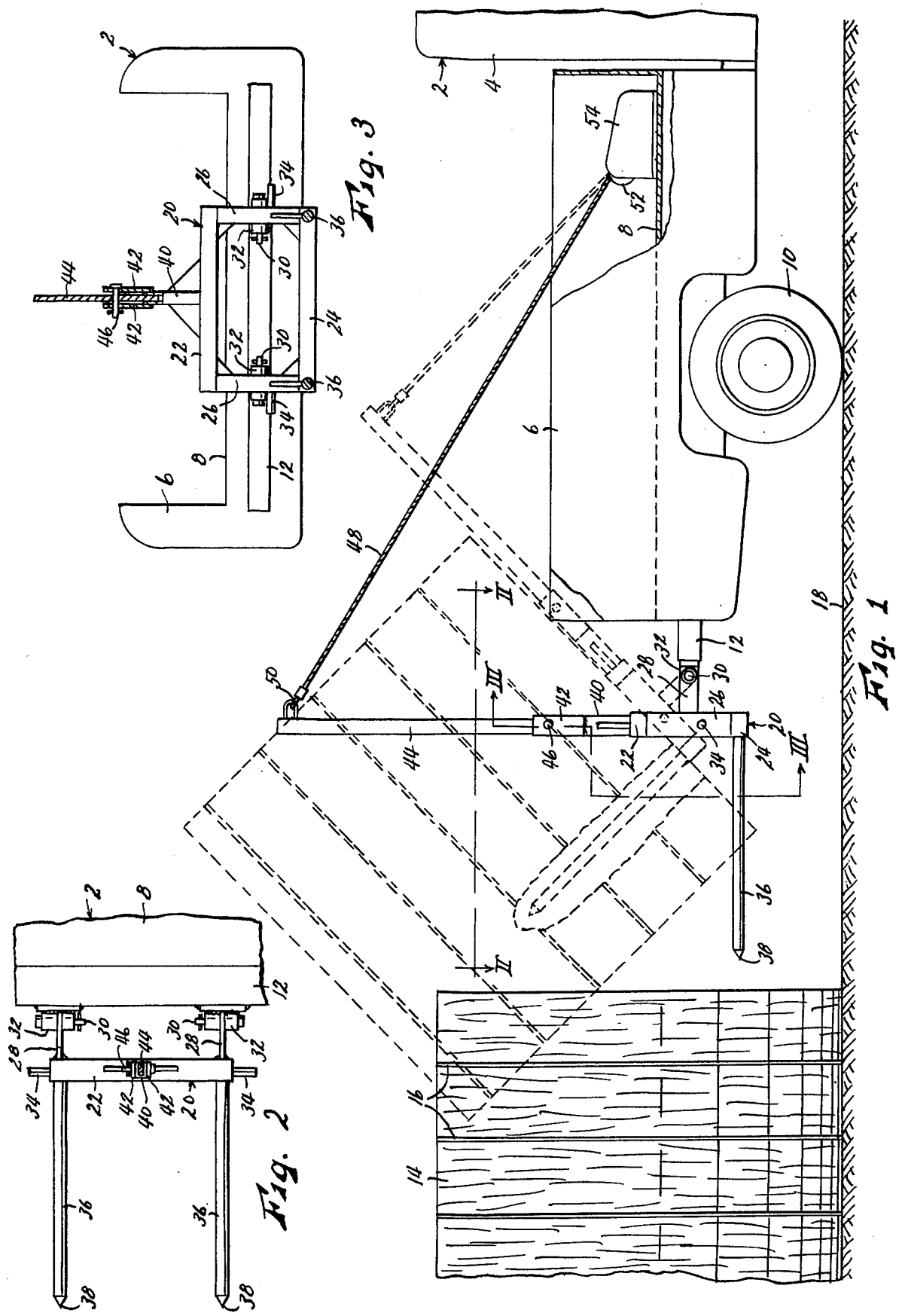

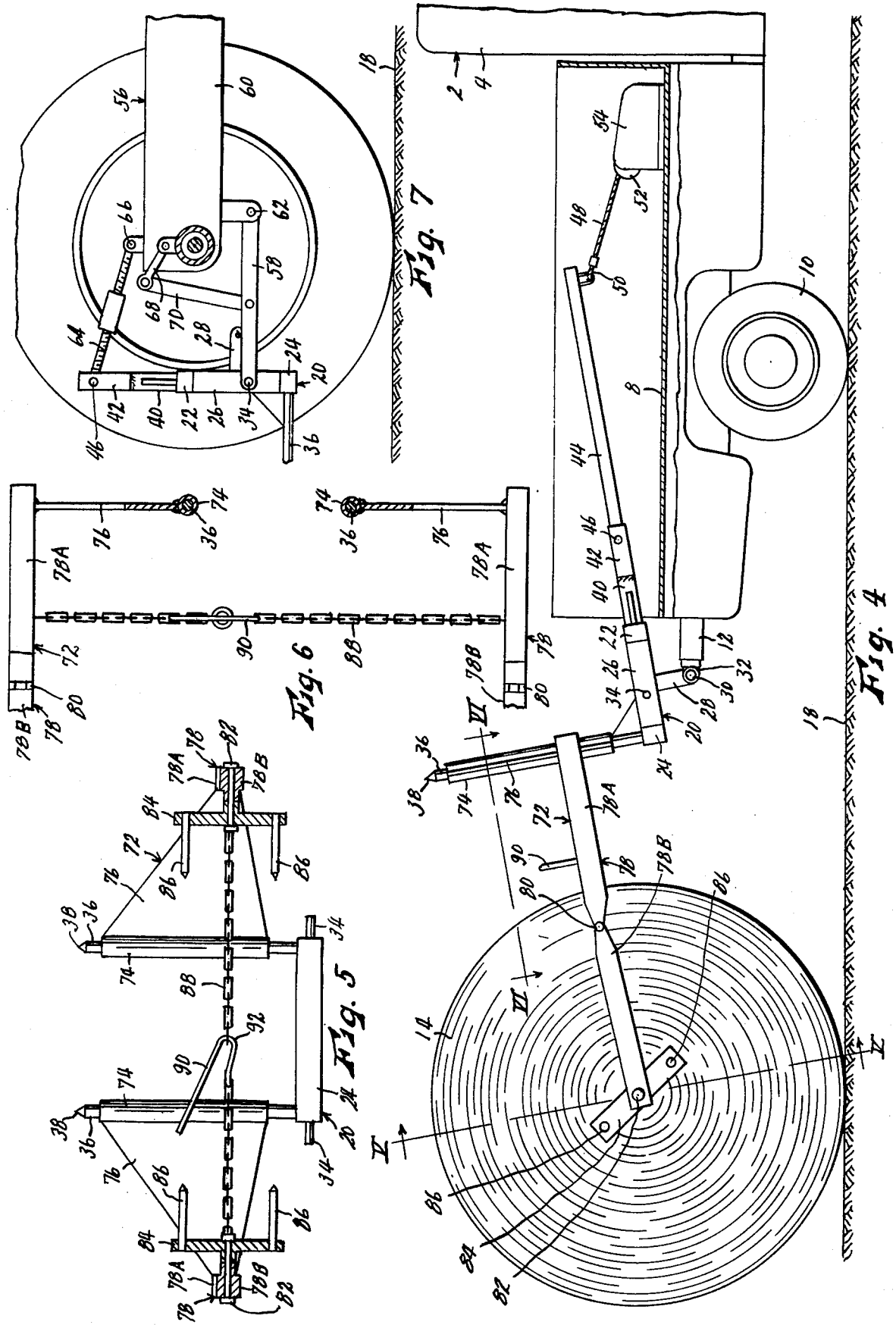

BALE LIFTER AND CARRIER ATTACHMENT

This invention relates to new and useful improvements in devices for lifting and carrying large bales of hay or the like, and has particular reference to a device for use in connection with very large bales.

Large cylindrical bales have come into quite widespread usage for the storage of hay and the like, since they do possess several advantages of economy and the like. However, due to the large size and heavy weight of such bales, a common size being about 6 feet in diameter and 6 feet in axial length, weighing about 1,500 to 2,000 pounds, the efficient and convenient lifting, carrying and transporting of such bales remains a problem, and there is a definite need for a truly effective device for accomplishing these functions. The provision of such a device is the overall object of the present invention.

Generally, this object is accomplished by the provision of a frame including means for mounting it on a carrying vehicle for pivotal movement on a horizontal axis transverse to the line of travel of the vehicle, a pair of parallel prongs fixed to said frame and projecting therefrom, and power means for tilting said frame, whereby said prongs may be moved from a horizontal position parallel to the line of vehicle travel, in which position they may be inserted in a bale above ground level by propelling the vehicle toward the free ends of the prongs, to a raised position inclined upwardly toward their free ends, whereby the bale is lifted from the ground, and whereby the bale is urged onto the prongs by gravity, so that it will not be shaken free of the prongs as the vehicle travels over rough terrain.

Also, it is often desired to unroll such a bale on the ground, reversing the rolling process by which the bale was originally formed, in order to feed said bale more effectively to livestock. Accordingly, another object of the present invention is the provision of a bale unroller for this purpose, said unroller serving as an adjunct to the lifter and carrier, and utilizing the prongs of the lifter and carrier as elements of the unroller.

Other objects are simplicity and economy of construction, and efficiency, dependability and convenience of operation and use.

With these objects in view, as well as other objects which will appear in the course of the specification, reference will be had to the accompanying drawing, wherein:

FIG. 1 is a fragmentary side elevational view of a pick-up truck having a bale lifter and carrier embodying the present invention operatively mounted thereon, the device being shown in solid lines in position to engage a bale, and in dotted lines fully engaged in the bale and with the bale lifted to a carrying position, FIG. 2 is a fragmentary sectional view taken on line II—II of FIG. 1, FIG. 3 is a fragmentary sectional view taken on line III—III of FIG. 1, FIG. 4 is a view similar to FIG. 1, but including a bale unroller serving as an adjunct to the lifter and carrier, operatively engaged with a bale for the unrolling thereof, FIG. 5 is a sectional view taken on line V—V of FIG. 4, with the bale omitted, FIG. 6 is a fragmentary sectional view taken on line VI—VI of FIG. 4, with the bale omitted, and FIG. 7 is a view similar to FIG. 1, but showing the lifter and carrier mounted operatively on the usual three-point implement hitch of a farm tractor.

Like reference numerals apply to similar parts throughout the several views, and in FIG. 1 the numeral 2 applies generally to a pick-up truck of an ordinary type, including a cab 4, a truck bed 6 the floor of which is indicated at 8, rear wheels 10, and a rear bumper 12 disposed somewhat below the level of bed floor 8, all associated in the usual manner. The numeral 14 applies to a bale of hay or the like of the type primarily intended to be handled by the present device. Said bale is cylindrical as shown in FIGS. 1 and 4, a common size being 6 feet in diameter and length, usually weighing from 1,500 to 2,000 pounds. Such bales are normally formed by a rolling process, and secured against unrolling by spaced apart loops of binder twine 16 tied around its cylindrical surface. Ordinarily, at the time it may be desired to lift and carry such a bale, it is resting on the ground 18 on its cylindrical surface.

The lifting and carrying device contemplated by the present invention includes a strongly built, generally rectangular frame 20 normally carried in a vertical plane just behind rear bumper 12 of the truck and including a horizontal top leg 22, a horizontal bottom leg 24, and vertical side legs 26. Affixed to each side leg 26, in spaced relation above its lower end is a forwardly extending arm 28, disposed at right angles to the plane of the frame. The forward end of each arm 28 is detachably connected to rear bumper 12 of the pick-up truck, on a horizontal axis transverse to the truck, by a pivot pin 30 removably inserted through a tubular keeper 32, which may be welded or otherwise permanently affixed to the bumper. Thus the frame may be quickly and easily mounted on or removed from the pick-up truck whenever desired. Extending laterally and horizontally outwardly from each side leg 26, also intermediate the ends of said side legs, is a rigidly affixed pivot pin 34, said pins being coaxial on a horizontal transverse axis. Pins 34 are useful in mounting the frame on the implement hitch of a farm tractor, as will appear.

A pair of parallel prongs 36 are fixed respectively to the lower corners of frame 20, projecting rearwardly therefrom in parallel relation, and being pointed at their rearward ends as indicated at 38. For use with bales 14 of the size given by way of example, a spacing of about 30 inches between the prongs, and a prong length of about 40 inches, have been found satisfactory, but this of course is a matter of proper design choice.

Fixed to the midpoint of top leg 22 of frame 20 is an upwardly extending tubular standard 40, the height of which is extended by a pair of side plates 42 welded thereto. A standard extension 44 of greater height is inserted slidably into the upper end of standard 40, and secured in place by a pin 46 releasably inserted through said extension and through side plates 42. This type of standard is useful in adapting the device to be mounted on the implement hitch of a farm tractor, as will presently appear. A flexible cable 48 is attached to the upper end of standard extension 44, as indicated at 50, and extends downwardly and forwardly therefrom, being wound on the drum 52 of an electric winch 54 mounted on floor 8 of truck bed 6, adjacent the forward end thereof. Such electric winch units are common, commercially available units, and detailing of their construction is not deemed pertinent to the present invention. Said winch is powered from the electrical system of the truck, and may have control switches disposed either on its own structure, or inside of truck cab 4.

In the use of the device as shown in FIGS. 1 – 3, cable 48 is paid out till standard 40 – 44 and frame 20 are disposed vertically, as shown in solid lines in FIG. 1, and prongs 36 are disposed horizontally, above ground level. Truck 2 is then maneuvered relative to a bale 14 resting on the ground to dispose said prongs parallel to the cylindrical axis of the bale. The truck is then backed to insert said prongs horizontally into the bale. Winch 54 is then operated to draw in cable 48, tilting frame 20, standard 40 – 44 and prongs 36 to the position shown in dotted lines in FIG. 1. Since pivot 30 of the frame was originally above and forward of the front plane of frame 20, and above the prongs, this elevates the prongs to lift the bale now carried by the prongs above ground level, and also tilts said prongs to an upwardly and rearwardly inclined position, so that the bale is thereafter urged onto and maintained on said prongs by gravity. The front surface of frame 20 is substantially planar and of a broad area, and also serves to assist in the support of the bale. Thus the truck 2 may be driven rapidly, even over rough terrain, with no danger that the bale will fall or be shaken free from the prongs.

The use of at least a plurality of prongs, rather than a single prong, is important both in providing a strong mounting for the bale, and also in preventing rotation of the bale about the prong as an axis, which could occur if only a single prong were used, and which would be likely to cause the bale to tear free from the single prong. The lifter and carrier as described could obviously be mounted on nearly any self-propelled vehicle, as well as on the pick-up truck shown, and either at the forward or rearward end of the vehicle, the only limiting factor being that prongs 36 must be movable to a horizontal position projecting away from the vehicle in a direction parallel to the line of travel of the vehicle.

FIG. 7 shows the mounting of the device on the usual three-point implement hitch of a farm tractor 56. In this case, the hitch includes a pair of lower draft links 56 (one shown) each of which is pivoted at its forward end, as at 62, to tractor body 60, and the rearward end of each is pivoted to one of the pivot pins 34 of the present device, whereby to mount said device, rather than to the arms 28 of the device. Standard extension 44, which was used in FIGS. 1 – 3 is discarded, and top link 64 of the hitch, which is pivoted at its forward end to the tractor body, as at 66, is pivoted between side plates 42 by means of pivot pin 46. The hitch also includes a crank 68 pivoted on the tractor body 60 and power driven by means forming a part of the hydraulic system of the tractor, as is well known in the art, the free end of said crank being connected by pivoted links 70 (one shown), to intermediate points of draft links 58. The operation of the lifter and carrier when so attached to a tractor is substantially the same as in FIGS. 1 – 3, it being obvious that when crank 68 is pivoted upwardly, it elevates the rearward ends of draft links 58 to raise the present device, and hence to elevate the bale carried on prongs 36 above the ground, while link 64 draws the top end of standard 40 forwardly to tilt frame 20 to incline prongs 36 upwardly to the rear.

FIGS. 4 – 6 show a bale unrolling device, designated generally by the numeral 72, which may be used as an adjunct to the lifting and carrying device. As previously mentioned, bales such as bale 14 are commonly formed by rolling a flat batt of hay around the bale axis, and it is sometimes desired to unroll the bale on the ground for more efficient feeding thereof to livestock. This may be done, after binder twine loops 16 are cut, simply by rolling the bale on the ground on its cylindrical surface. To use the unrolling device 72, winch 54 is first operated to draw standard 40 – 44 to as nearly a horizontal position as possible, so that prongs 36 project upwardly in a nearly vertical position, as shown in FIG. 4. Unrolling device 72 includes a pair of sleeves 74 each of which may be slipped over one of prongs 36 and which may rotate freely on said prong. Affixed to each sleeve 74 is a laterally extending web 76, to the extended end of which is affixed the forward portion 78A of a rearwardly extending arm 78. Arms 78 are disposed generally at right angles to sleeves 74, though of course transversely offset therefrom by webs 76, and normally extend rearwardly from said sleeves in generally parallel relation. Each arm 78 also includes a rearward portion 78B connected to forward portion 78A by a horizontal, transverse hinge 80, whereby rearward portion 78B may pivot freely upwardly and downwardly. At the rearward end of each arm portion 78B, it carries a horizontal transverse bolt 82 on which the midpoint of a head bar 84 is rotatably mounted, bars 84 being disposed at the confronting or inner sides of the two arms 78. Each bar 84 has a pair of pointed prongs 86 affixed therein respectively adjacent opposite ends thereof, said prongs extending horizontally inwardly and being parallel to bolts 82. Arms 78 may be swung pivotally apart by pivoting of sleeves 74 on prongs 36. They may be moved forcibly toward each other by a chain 88 extending horizontally and transversely between arm portions 78A, as best shown in FIGS. 5 and 6, said chain being divided between its ends with the chain ends at the division being detachably joined by a chain connector 90 of any suitable type. As shown, said connector consists of a rigid, generally U-shaped rod connected at one end to one section of chain, and its opposite end being adapted to be inserted through a link of the other chain section, so that when the connector is then turned in its own plane, the chain sections are tensioned and drawn closer until said chain link enters the bight 92 of the connector, as shown in FIG. 5.

In the use of the unrolling device, its sleeves 74 are mounted on prongs 36 as shown and described, chain connector 90 is released and arms 78 swing apart, truck 2 maneuvered to allow prongs 86 of arm sections 78B to be as shown positioned in FIG. 4, with the rotary axes 82 of said prongs being as nearly coaxial with a bale 14 as possible, chain connector 90 re-engaged and tightened to pull prongs 86 firmly into the bale, and binder twine loops 16 of the bale cut free. Forward motion of truck 2 will then roll bale 14 freely on the ground, unrolling the hay batt of which the bale is formed. Rotation of bars 84 on bolts 82 permits the bale to turn freely as it rolls, and hinges 80 of arms 78 permit the bale to rest firmly on the ground at all times, despite the fact that its diameter is constantly decreasing as it unrolls, and despite the fact that truck 2 may be trasversing rough or uneven terrain.

When I have shown and described a specific embodiment of my invention, it will be readily apparent that many minor changes of structure can operation could be made without departing from the spirit of the invention.

What I claim as new and desire to protect by Letters Patent is:

1. A lifting and carrying device for bales of hay or the like resting on the ground, said device being attachable to any self-propelled vehicle, and comprising:
   a. a frame;
   b. means operable to mount said frame on said vehicle for pivotal movement on a horizontal axis transverse to the line of travel of said vehicle,
   c. a pair of prongs fixed on said frame and projecting therefrom in parallel relation, the vertical planes of said prongs being parallel to said line of vehicle travel and transversely spaced apart relative thereto,
   d. operating means carried by said vehicle and operable to pivot said frame relative to said vehicle from a position in which said prongs are horizontal and may be inserted into said bale by propelling said vehicle, to a position in which said prongs are inclined upwardly toward their free ends, whereby said bale is lifted above the ground and is urged onto said prongs by gravity, said operating means being operable to move said prongs to a generally vertical, upwardly projecting position, and,
   e. a bale unrolling device operable to unroll cylindrical bales of hay, and comprising a pair of generally horizontal arms disposed in transversely spaced apart relation, means for mounting one end of each of said arms on each of said prongs so as to be horizontally pivotal on said prong and to extend generally at right angles to said prong, a head member carried at the opposite end of each of said arms for rotation on a horizontal axis transverse to said arm and generally coaxial with a cylindrical bale, and including secondary prongs insertable into said bale in generally parallel relation to its axis, and releasable means connecting said arms exteriorly of said bale and operable to prevent separation of said arms by pivotal movement of said arms relative to said prongs, whereby to secure said secondary prongs in engagement with said bale.

2. A device as recited in claim 1 wherein said means for mounting each of said arms on one of said prongs consists of a tubular sleeve fixed to said arm and engageable slidably and rotatably over said prong.

3. A device as recited in claim 1 wherein each of said arms is divided intermediate its ends into two sections, one section being pivoted on its associated prong and the other carrying its associated head member, said arm sections being pivotally joined on a horizontal transverse axis to permit relative vertical movement of said sections.

* * * * *